United States Patent
Natsume (10) Patent No.: US 9,352,724 B2
(45) Date of Patent: May 31, 2016

(54) WIPER DEVICE

(71) Applicant: ASMO CO., LTD., Kosai, Shizuoka-pref. (JP)

(72) Inventor: Takashi Natsume, Kosai (JP)

(73) Assignee: ASMO CO., LTD., Kosai, Shizuoka-pref.

( * ) Notice: Subject to any disclaimer, the term of this patent is extended or adjusted under 35 U.S.C. 154(b) by 374 days.

(21) Appl. No.: 13/762,407

(22) Filed: Feb. 8, 2013

(65) Prior Publication Data

US 2013/0207577 A1   Aug. 15, 2013

(30) Foreign Application Priority Data

Feb. 10, 2012   (JP) ................... 2012-027704

(51) Int. Cl.
*B60S 1/08*   (2006.01)

(52) U.S. Cl.
CPC . *B60S 1/08* (2013.01); *B60S 1/0896* (2013.01)

(58) Field of Classification Search
CPC .................................. B60S 1/08; B60S 1/089
USPC .......................................... 318/280, 283, 286
See application file for complete search history.

(56) References Cited

U.S. PATENT DOCUMENTS

| | | | |
|---|---|---|---|
| 4,559,484 A | 12/1985 | Hirano | |
| 4,904,908 A | 2/1990 | Buschur | |
| 6,306,220 B1 | 10/2001 | Zimmer | |
| 2008/0094016 A1* | 4/2008 | Kwon et al. | 318/468 |
| 2010/0037416 A1* | 2/2010 | Amagasa et al. | 15/250.31 |
| 2010/0175216 A1* | 7/2010 | Natsume | 15/250.12 |

FOREIGN PATENT DOCUMENTS

| | | |
|---|---|---|
| FR | 2714641 A1 | 7/1995 |
| JP | S58-20546 | 2/1983 |
| JP | 58-78848 A | 5/1983 |
| JP | 60-67241 A | 4/1985 |
| JP | 60-67242 A | 4/1985 |
| JP | 1-195159 A | 8/1989 |
| JP | 5-37616 U | 5/1993 |
| JP | 4038016 B | 1/2008 |

OTHER PUBLICATIONS

Full English Translation of the following: Office action dated Apr. 28, 2015, from the JPO in a Japanese patent application corresponding to the instant patent application. This office action translation is submitted now in order to supplement the understanding of the cited references which are being disclosed in the instant Information Disclosure Statement.

* cited by examiner

*Primary Examiner* — Kawing Chan
(74) *Attorney, Agent, or Firm* — SOLARIS Intellectual Property Group, PLLC (57) ABSTRACT

A wiper device is provided that suppresses plastic deformation of a blade rubber of a wiper blade without wasting power of a battery installed to a vehicle. A wiper device is equipped with wiper blades that wipe a vehicle front glass, a wiper motor that swings the wiper blades in alternating between an upper turn position and a lower turn position by accompanied rotation of the output shaft, and a control unit that controls the wiper motor. In a case of the vehicle ignition switch being ON or OFF, the control unit controls the wiper motor such that from a stopped position where the wiper blades are located, the wiper blades are swung in a specific range of between a first stopping position and a second stopping position, and then stopped.

8 Claims, 7 Drawing Sheets

WIPER DEVICE

CROSS-REFERENCE TO RELATED APPLICATION

This application claims priority under 35 USC 119 from Japanese Patent Application No. 2012-027704 filed Feb. 10, 2012, the disclosure of which is incorporated by reference herein.

BACKGROUND OF THE INVENTION

1. Field of the Invention

The present invention relates to a wiper device, and in particular to a wiper device that suppresses plastic deformation of a blade rubber of a wiper blade.

2. Related Art

In a wiper device for wiping a vehicle windshield, a wiper blade is stopped at a specific location at a lower portion of the vehicle windshield when not being operated.

The stationary wiper blade is pressed against the front windshield by a spring provided in a wiper arm that connects a wiper motor that operates the wiper device and the wiper blade. Thus, when the wiper device is not operated for a long duration, there is a concern that the blade rubber of the wiper blade pressed against the front windshield might undergo plastic deformation.

Japanese Patent No. 4038016 (Patent Document 1) for example discloses a wiper device that moves a wiper blade to mutually different stopping positions of P1 or P2 every day when the wiper device has not been used for a duration of 1 month.

In the wiper device disclosed in Patent Document 1 control is performed so that the wiper device moves the wiper blade to the P1 or the P2 when the vehicle is not being driven, and so a vehicle installed computer and wiper motor are operated without starting the vehicle engine, an unfavorable condition when generating power with an alternator. There is accordingly an issue that power stored in the vehicle mounted battery is wasted.

SUMMARY OF THE INVENTION

The present invention is directed towards addressing the above issue, and an object of the present invention is to provide a wiper device that suppresses plastic deformation of a blade rubber of a wiper blade without wasting power of a vehicle installed battery.

In order to address the above issue, a wiper device according to a first aspect of the present invention includes: a wiper blade that wipes a front glass of a vehicle, via a wiper arm which is supported so as to be capable of swinging with respect to the vehicle, by swinging of the wiper arm; a wiper motor that includes an output shaft connected to the wiper arm through a link so as to be capable of transmitting rotation force to the wiper arm, and that rotates the output shaft to swing the wiper blade in alternating; and a control unit that, in a case in which an ignition switch of the vehicle is switched ON or OFF, controls the wiper motor such that the wiper blade is swung within a specific range from a position where the stopped wiper blade is located at a time when the ignition switch is switched ON or OFF, and the wiper blade is then stopped.

In the wiper device according to the first aspect, each time the ignition switch is operated in a stop state of the wiper blade, the wiper blade is swung within the specific range from the position where stopped the wiper blade is located. This thereby changes the mode in which the rubber of the wiper blade is pressed against the front glass, and so plastic deformation of the blade rubber of the wiper blade can be suppressed.

Moreover, in the wiper device of the first aspect, swinging the wiper blade, from its stopped position, within the specific range is performed according to operation of the ignition switch, accompanied run of the vehicle. Accordingly, the power usage of the wiper motor and the vehicle installed computer to change the stop position of the wiper blade can be supplemented with electricity generated by the vehicle alternator. Consequently, plastic deformation of the blade rubber of the wiper blade can be suppressed without wasting the power of the vehicle installed battery.

In the aspect, it is possible that the control unit controls the wiper motor such that the wiper blade is stopped in a state in which a tilt direction of a portion of the wiper blade, that wipes the front glass, with respect to the front glass is changed to a different direction with respect to a tilt direction of the portion of the wiper blade at the time when the ignition switch is switched ON or OFF.

A wiper device of a second aspect is the wiper device of the first aspect wherein: the wiper motor rotates forward and reverse the output shaft to swing the wiper blade between an upper turn position and a lower turn position, and in a case of stopping the swinging of the wiper blade between the upper turn position and the lower turn position, the wiper motor swings the wiper blade either to a first stopping position or a second stopping position provided above the first stopping position and stops the wiper blade; and in the case in which the ignition switch is switched ON or OFF, the control unit controls the wiper motor such that the wiper blade is swung and stopped at the second stopping position in a case in which the wiper blade is stopped at the first stopping position at the time when the ignition switch is switched ON or OFF, and the wiper blade is swung and stopped at the first stopping position in a case in which the wiper blade is stopped at the second stopping position at the time when the ignition switch is switched ON or OFF.

According to this wiper device, the wiper blade that has been stopped from swinging is stopped at the first stopping position or the second stopping position. Plastic deformation of the blade rubber of the wiper blade can be suppressed by, for example, in the case in which the ignition switch is operated, swinging the wiper blade within the specific range, that is, between the first stopping position and the second stopping position so as to move the wiper blade to the second stopping position when the wiper blade is stopped in the first stopping position.

A wiper device of a third aspect is the wiper device of the second aspect wherein: the control unit includes a storage section that stores a history of control performed with respect to the wiper motor; and in the case in which the ignition switch is switched ON or OFF, the control unit controls the wiper motor such that the history stored in the storage section is read, the wiper blade is swung and stopped at the second stopping position in a case in which the wiper blade was stopped at the first stopping position by control performed at the previous time when the ignition switch was switched ON or OFF, and the wiper blade is swung and stopped at the first stopping position in a case in which the wiper blade was stopped at the second stopping position by control performed at the previous time when the ignition switch was switched ON or OFF.

According to this wiper device, the wiper blade can be stopped in a different mode (shape) to that controlled at the previous time, by referring the stopping position of the wiper blade by the control performed at the previous time, and moving the wiper blade to a stopping position different from that by the control performed at the previous time. Plastic deformation of the blade rubber of the wiper blade can accordingly be suppressed.

A wiper device of a fourth aspect is the wiper device of the second aspect further including a detection unit that detects, in the case in which the ignition switch is switched ON or OFF, the position where the stopped wiper blade is located at the time when the ignition switch is switched ON or OFF, wherein, in the case in which the ignition switch is switched ON or OFF, the control unit controls the wiper motor such that the wiper blade is swung and stopped at the second stopping position in a case in which the position of the wiper blade detected by the detection unit is the first stopping position, and the wiper blade is swung and stopped at the first stopping position in a case in which the position of the wiper blade detected by the detection unit is the second stopping position.

According to this wiper device, each time the ignition switch is operated, the stopping position of the wiper blade is ascertained (recognized), and the wiper blade is moved to a stopping position different from the ascertained stopping position. Plastic deformation of the blade rubber of the wiper blade can thus be suppressed.

A wiper device of a fifth aspect is the wiper device of the first aspect wherein: the wiper motor rotates forward and reverse the output shaft to swing the wiper blade between an upper turn position and a lower turn position, and in a case of stopping the swinging of the wiper blade between the upper turn position and the lower turn position, the wiper motor swings the wiper blade to a stopping position and stops the wiper blade; the control unit includes a storage section that stores a history of control performed with respect to the wiper motor; and in the case in which the ignition switch is switched ON or OFF, the control unit controls the wiper motor such that the history stored in the storage section is read, the wiper blade is swung to an upper return position provided above the stopping position and thereafter is stopped at the stopping position in a case in which the wiper blade was swung to a lower return position provided below the stopping position and thereafter was stopped at the stopping position by control performed at the previous time when the ignition switch was switched ON or OFF, and the wiper blade is swung to the lower return position and thereafter is stopped at the stopping position in a case in which the wiper blade was swung to the upper return position and thereafter was stopped at the stopping position by control performed at the previous time when the ignition switch was switched ON or OFF.

According to this wiper device, each time the ignition switch is switched ON or OFF the wiper blade is stopped in the original stopping position after moving the wiper blade within the specific range. Plastic deformation of the blade rubber of the wiper blade can accordingly be suppressed, and the wiper blade in the stop state can also always be disposed in a constant (same) position.

A wiper device of a sixth aspect is the wiper device of the fifth aspect wherein: a separation between the stopping position and the upper return position and a separation between the stopping position and the lower return position are a distance such that an angle of a portion of the wiper blade, that wipes the front glass, with respect to the front glass can be changed by the wiper blade being moved by the amount of the separation.

According to this wiper device, plastic deformation of the blade rubber of the wiper blade can be suppressed since the angle of the portion of the wiper blade that wipes the front glass can be changed with certainty.

BRIEF DESCRIPTION OF THE DRAWINGS

Exemplary embodiments of the present invention will be described in detail based on the following figures, wherein.

DETAILED DESCRIPTION OF THE INVENTION

First Exemplary Embodiment

Explanation follows regarding a wiper device according to a first exemplary embodiment of the present invention, with reference to the drawings.

Figure 1:
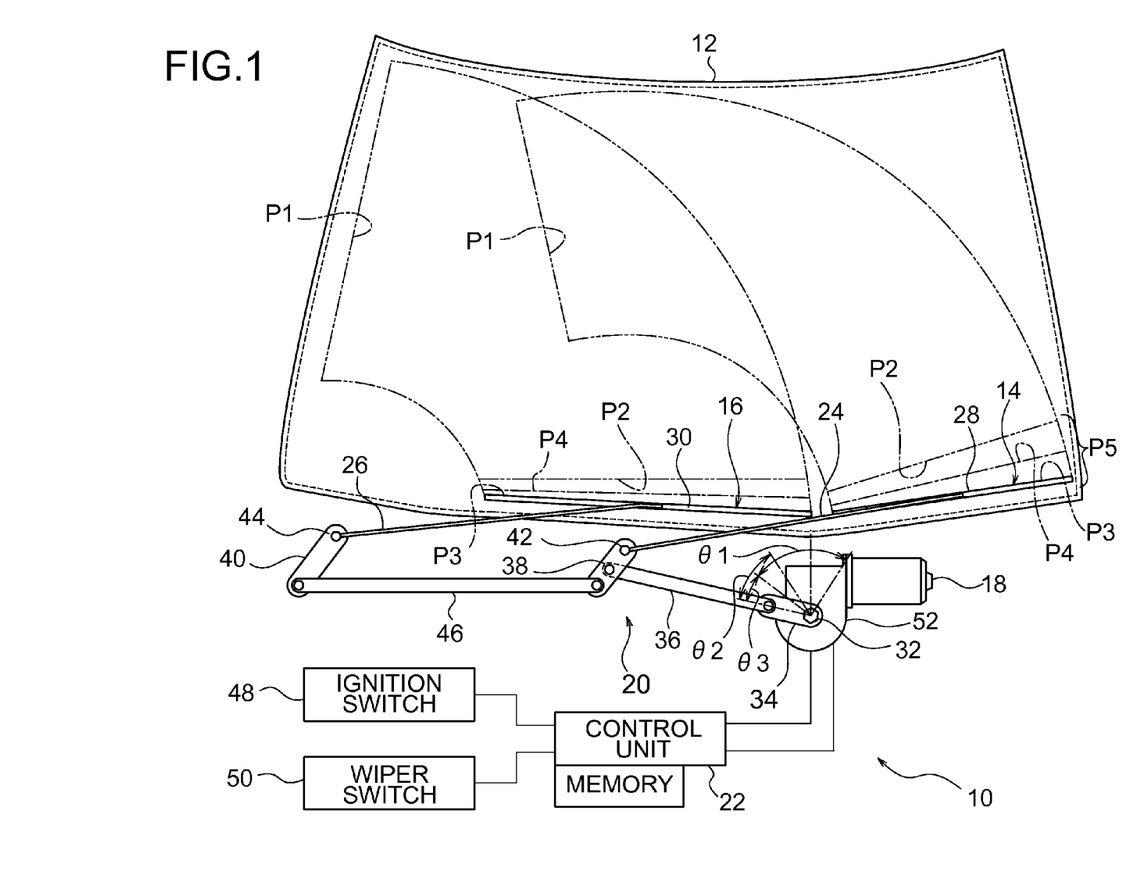
FIG. 1 is a schematic diagram illustrating a configuration of a wiper device according to a first exemplary embodiment of the present invention.

FIG. 1 is a schematic diagram illustrating a configuration of a wiper device 10 according to the present exemplary embodiment. The wiper device 10 is, for example, employed for wiping a front glass (windshield) 12 provided at a vehicle such as a passenger car. The wiper device 10 includes a pair of wipers 14 and 16, a wiper motor 18, a link mechanism 20, and a control unit 22.

The wipers 14 and 16 are respectively configured with wiper arms 24 and 26, and wiper blades 28 and 30. A base end portion of each of the wiper arms 24 and 26 is fixed respectively to pivot shafts 42 and 44, described later, and the wiper blades 28 and 30 are respectively fixed to leading end portions of the wiper arms 24 and 26.

In the wipers 14 and 16, the wiper blades 28 and 30 move in alternating (opposite directions) over the front glass 12 accompanied swinging (rotating) of the wiper arms 24 and 26, and the wiper blades 28 and 30 wipe a surface of the front glass 12.

The wiper motor 18 includes an output shaft 32 that is forward and reverse rotatable through a reduction mechanism 52 configured mainly by worm gears. The link mechanism 20 includes a crank arm 34, a first link rod 36, a pair of pivot levers 38 and 40, the pair of pivot shafts 42 and 44, and a second link rod 46.

One end side of the crank arm 34 is fixed to the output shaft 32, and the other end side of the crank arm 34 is connected to one end side of the first link rod 36 so as to be capable of rotating. Another end side of the first link rod 36 is connected to a location of the pivot lever 38, which location is nearer to an end of the pivot lever 38 that is different from an end of the pivot lever which end having the pivot shaft 42, and is connected so as to be capable of rotating. The two (both) ends of the second link rod 46 are respectively in rotatable manner connected to the end of the pivot lever 38 that is different from the end of the pivot lever which end having the pivot shaft 42, and to an end of the pivot lever 40 that end corresponds to this end of the pivot lever 38 that is different.

The pivot shafts 42 and 44 are pivotally supported by pivot holders, not shown in the drawings, provided to the vehicle body. The wiper arms 24 and 26 are respectively fixed, via the pivot shafts 42 and 44 to the ends respectively having pivot shafts 42 and 44 of the pivot levers 38 and 40.

In the wiper device 10 according to the present exemplary embodiment, when the output shaft 32 is forward and reverse rotated with a first swing (rotating) range θ1, the rotation force of the output shaft 32 is transmitted through the link mechanism 20 to the wiper arms 24 and 26, and the wiper blades 28 and 30 move in alternating (opposite directions) over the front glass 12 between upper turn positions P1 and lower turn positions P2 as the wiper arms 24 and 26 swing in alternating (opposite directions).

In the wiper device 10, when the output shaft 32 forward and reverse rotates with a second swing range θ2, the wiper blades 28 and 30 move between the lower turn positions P2 and first stopping positions P3 each of which is lower than the lower turn position P2 as the wiper arms 24 and 26 swing in alternating (opposite directions).

In the present exemplary embodiment, the wiper blades 28 and 30 move between the lower turn positions P2 and the first stopping positions P3 in a case in which the movement in alternating of the wiper blades 28 and 30 between the upper turn positions P1 and the lower turn positions P2 for wiping the front glass is ended (finished), so for convenience, each area between the lower turn position P2 and the first stopping position P3 is as a storage area P5.

When the output shaft 32 is forward and reverse rotated with a third swing range θ3, the wiper blades 28 and 30 are moved between the first stopping positions P3 and second stopping positions P4 as the wiper arms 24 and 26 swing in alternating.

In the wiper device 10 according to the present exemplary embodiment, as illustrated in FIG. 1, the crank arm 34 and the first link rod 36 form a straight line shape when the wiper blades 28 and 30 are positioned in the first stopping positions P3.

The control unit 22 is connected to the wiper motor 18 in order to control the rotation of the wiper motor 18.

The control unit 22 is, for example, configured including an input circuit, an ECU, a drive circuit, and a memory for storing history of wiper control, and is connected to an ignition switch 48 that in an ON state supplies power to an ignition system of a vehicle internal combustion engine, and to a wiper switch 50.

In the present exemplary embodiment, each time the ignition switch 48 has been switched ON or OFF, the control unit 22 is given notification of that the ignition switch 48 is switched ON or OFF. The control unit 22 controls the wiper motor 18 each time the ignition switch 48 has been switched ON or OFF so as to swing the wiper (wiper blades 28 and 30) within a specific range from its stopping position, and then stop the wiper.

History of control performed on the wiper motor 18 each time the ignition switch 48 has been switched ON or OFF is stored in the memory provided to the control unit 22. The control unit 22 refers (reads) the history stored in the memory (FIG. 1) when the ignition switch 48 has been switched ON or OFF. The wiper motor 18 is controlled to move the wiper blades 28 and 30 to the second stopping positions P4 in a case in which, by control of the previous time the ignition switch 48 was switched ON or OFF, the wiper blades 28 and 30 were stopped in the first stopping position P3. The wiper motor 18 is controlled to move the wiper blades 28 and 30 to the first stopping position P3 in a case in which, by control of the previous time the ignition switch 48 was switched ON or OFF, the wiper blades 28 and 30 were stopped in the second stopping positions P4.

The wiper switch 50 is a switch that switches power supply from the vehicle battery to the wiper motor 18 ON or OFF.

The wiper switch 50 is switchable among: a low speed operation mode selection position that causes the wiper blades 28 and 30 to swing at low speed; a high speed operation mode selection position that causes the wiper blades 28 and 30 to swing at high speed; an intermittent operation mode selection position that causes the wiper blades 28 and 30 to swing intermittently at a specific cycle; and a storage (stop (stationary)) mode selection position. The wiper switch 50 outputs to the control unit 22 a signal corresponding to the selection position for each mode.

When the signal corresponding to the selection position for each mode is output from the wiper switch 50 to the control unit 22, the control unit 22 then performs control according to the output signal from the wiper switch 50.

Figure 2:
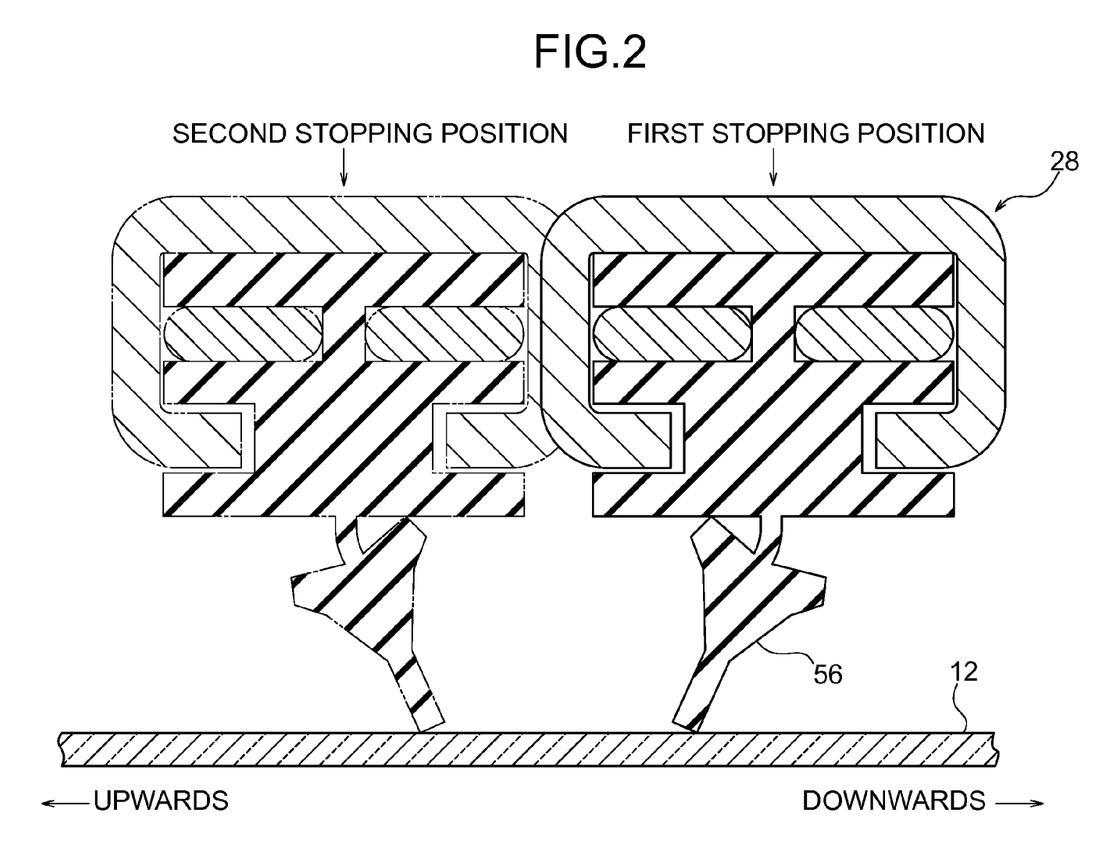
FIG. 2 is a cross-section, including a front glass, of a wiper blade of a wiper device according to the first exemplary embodiment of the present invention in a first stopping position and a second stopping position.

FIG. 2 is a cross-section of the wiper blade 28, including the front glass 12, at the first stopping position P3 and at the second stopping position P4 of the wiper device 10 according to the present exemplary embodiment. In FIG. 2 the left hand side corresponds to upwards on the front glass 12, and the right hand side corresponds to downwards on the front glass 12.

When the wiper blade 28 stops in the first stopping position P3, a lip portion 56 of the rubber of the wiper blade 28 stops in a state in which it is tilted to the left hand side, namely towards the front glass 12 upper side, since the wiper blade 28 has stopped in the first stopping position P3 after being moved to arrive from upwards on the front glass 12.

When the wiper blade 28 stops in the second stopping position P4, the lip portion 56 of the rubber of the wiper blade 28 stops in a state in which it is tilted to the right hand side, namely to the front glass 12 lower side, since the wiper blade 28 has stopped in the second stopping position P4 after being moved to arrive from downwards on the front glass 12.

The rubber of the wiper blades is a resilient (elastic) body, however there is a concern that plastic deformation may occur in the rubber in a case in which the state at first stopping position P3 or the state at second stopping position P4 continues for a long duration, and that the ability of the wiper to wipe the front glass 12 might deteriorate when such plastic deformation occurs.

In the present exemplary embodiment, plastic deformation in the rubber of the wiper blades 28 and 30 is suppressed by changing the stopping positions of the wiper blades 28 and 30 to the first stopping positions P3 or the second stopping positions P4 each time the ignition switch 48 is switched ON or OFF.

Figure 3:
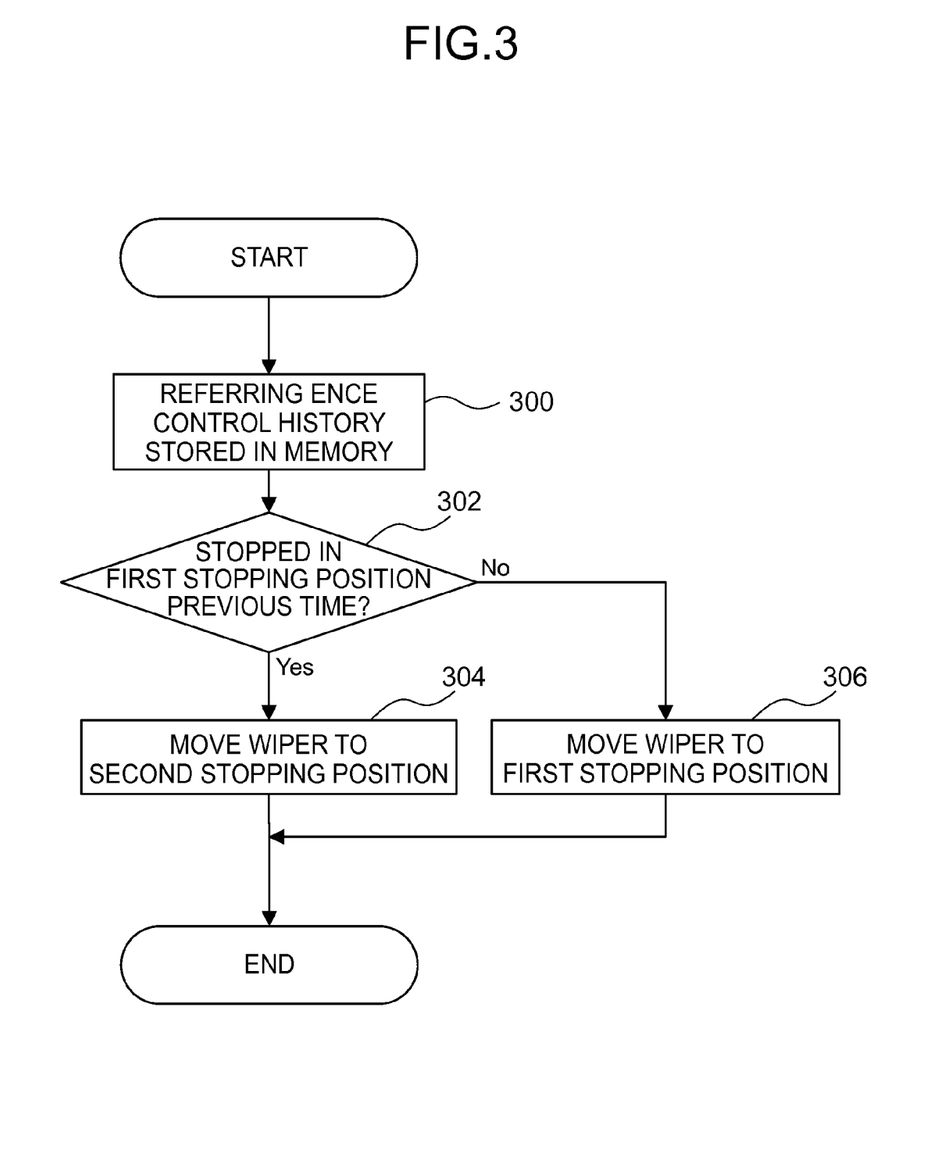
FIG. 3 is a flow chart illustrating control of a wiper device according to the first exemplary embodiment of the present invention.

Explanation next follows regarding control of the wiper device 10 according to the present exemplary embodiment. FIG. 3 is a flow chart illustrating control of the wiper device 10 according to the present exemplary embodiment.

When the ignition switch 48 is operated, referring is made, at step 300, to the history of the record of control of the stopping positions of the wiper blades 28 and 30 when the ignition switch 48 is operated, which history is stored in the memory.

At step 302, in the referred history, determination is made as to whether or not the wiper blades 28 and 30 were controlled so as to be stopped in the first stopping positions P3 at the last time (the previous time) when the ignition switch 48 was switched ON or OFF.

When determined at step 302 is made that the wiper blades 28 and 30 were stopped in the first stopping positions P3 by control at the last time when the ignition switch 48 was switched ON or OFF, then at step 304, the wiper blades 28 and 30 are moved so as to be stopped at the second stopping positions P4, and processing is ended.

When determined at step 302 is made that the wiper blades 28 and 30 were not stopped in the first stopping positions P3 by control at the last time when the ignition switch 48 was switched ON or OFF, namely when determined that the wiper blades 28 and 30 were stopped in the second stopping positions P4 by control at the last time when the ignition switch 48 was switched ON or OFF, then at step 306 the wiper blades 28 and 30 are moved so as to be stopped at the first stopping positions P3, and processing is ended.

Note that configuration may be made such that determination is made at step 302 as to whether or not the wiper blades 28 and 30 were stopped in the second stopping positions P4 by control at the last time when the ignition switch 48 was switched ON or OFF.

As explained above, according to the wiper device 10 of the present exemplary embodiment, plastic deformation in the rubber of the wiper blades 28 and 30 can be suppressed by changing the positions of the wiper blades 28 and 30 which have been stopped in each time the ignition switch is switched ON or OFF.

Moreover, configuration may be made such that a detection unit (FIG. 7) is further provided that, when the ignition switch 48 is switched ON or OFF, detects the positions where the wiper blades 28 and 30 have been stopped. The control unit 22 controls the wiper motor 18 so as to respectively move the wiper blades 28 and 30 such that the wiper blades 28 and 30 are moved to the second stopping positions P4 when the positions of wiper blades 28 and 30 which are detected by the detection unit are in the first stopping positions P3, and such that the wiper blades 28 and 30 are moved to the first stopping positions P3 when the positions of the wiper blades 28 and 30 which are detected by the detection unit are in the second stopping positions P4.

There are various possible ways for detecting the positions where the wiper blades 28 and 30 have been stopped, such as providing for example a MR (magnetoresistance) sensor to the reduction mechanism 52 of the wiper motor (FIG. 7), and detecting the stopping positions of the wiper blades 28 and 30 by detecting the positions of the wiper arms.

Figure 7:
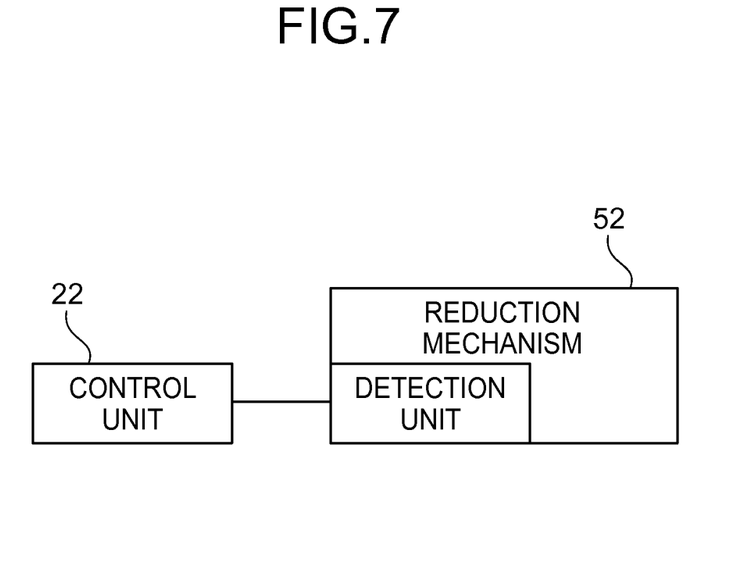
FIG. 7 is a diagram illustrating a detection unit of the present invention.

The stopping positions of the wiper blades 28 and 30 detected by the MR sensor or the like are the actual stopping positions of the wiper blades 28 and 30 at the current point in time, enabling control so as to stop the wiper blades 28 and 30 at stopping positions different from the stopping positions of the wiper blades 28 and 30 at the current point in time, with such control enabling deterioration by plastic deformation of the wiper blades 28 and 30 to be suppressed.

In the present exemplary embodiment, separately from the control explained in FIG. 3, the wiper blades 28 and 30 are stopped in the first stopping positions P3 or the second stopping positions P4 when the wiper switch 50 is switched OFF. In this case, it is considered to stop the wiper blades 28 and 30 in the first stopping positions which are located in the lower positions on the front glass 12 in order to avoid wind pressure during travel.

Or, configuration may be made such that, referring is made to the history of control at the last time when the ignition switch 48 was operated, such as in above step 300 and step 302, to determine the stopping positions of the wiper blades 28 and 30 when the wiper switch 50 is switched OFF.

Note that although in the present exemplary embodiment, the second stopping position P4 is provided between the lower turn position P2 and the first stopping position P3, the second stopping position P4 may be provided above the lower turn position P2, to give a sequence of second stopping position P4, lower turn position P2 and first stopping position P3 from upwards to downwards on the front glass 12.

In the present exemplary embodiment it is possible to provide the second stopping position P4 above the lower turn position P2 by adjusting the second swing range $\theta 2$ that is the range of forward and reverse rotation of the output shaft 32 to be larger than that in the case illustrated in FIG. 1.

In such case, since the distance between the first stopping position P3 and the second stopping position P4 becomes larger, tilting of the rubber portions of the wiper blades 28 and 30 with respect to the front glass 12 can be changed with certainty by moving the wiper blades 28 and 30 from the first stopping position P3 to the second stopping position P4 for example.

Moreover, in the present exemplary embodiment it is possible to provide the first stopping position P3 and the second stopping position P4 between the upper turn position P1 and the lower turn position P2 by changing the forward and reverse rotation range of the output shaft 32.

Second Exemplary Embodiment

Explanation follows regarding a wiper device according to a second exemplary embodiment of the present invention.

Figure 4:
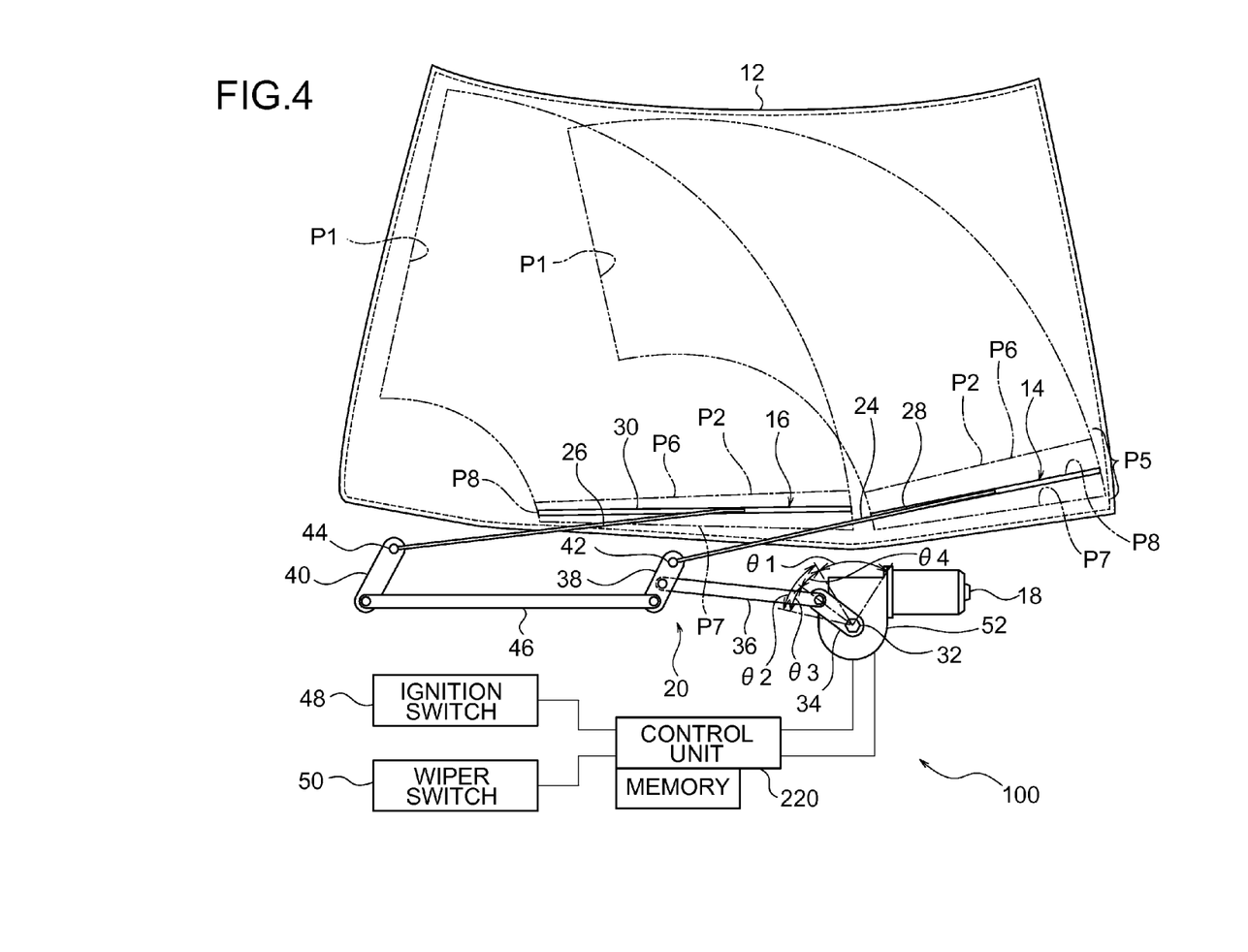
FIG. 4 is a schematic diagram illustrating a configuration of a wiper device according to a second exemplary embodiment of the present invention.

FIG. 4 is a schematic diagram illustrating a configuration of a wiper device 100 according to the present exemplary embodiment. The wiper device 100 is basically the same as the wiper device 10 according to the first exemplary embodiment, and similar configurations to that of the wiper device 10 of the first exemplary embodiment are allocated the same reference numerals in FIG. 4 to those of the wiper device 10 according to the first exemplary embodiment, and explanation thereof is omitted.

The wiper device 100 according to the present exemplary embodiment differs from the wiper device 10 according to the first exemplary embodiment in the provision of a control unit 220 and the stopping position of the wiper blades 28 and 30 based on control of the control unit 220. Whereas in the first exemplary embodiment the wiper blades 28 and 30 are stopped in one or other of the first stopping positions P3 and the second stopping positions P4, in the present exemplary embodiment, the wiper blades 28 and 30 are stopped in stopping positions P8 that are in positions equivalent to the second stopping positions P4 in the first exemplary embodiment.

In the present exemplary embodiment, when the output shaft 32 is forward and reverse rotated with a first swing range $\theta 1$, the rotation force of the output shaft 32 is transmitted through the link mechanism 20 to the wiper arms 24 and 26, and the wiper blades 28 and 30 move in alternating on the front glass 12 between the upper turn positions P1 and the lower turn positions P2 accompanying the swinging in alternating of the wiper arms 24 and 26.

Moreover, in the present exemplary embodiment, when the output shaft 32 is forward and reverse rotated with a second swing range $\theta 2$, the wiper blades 28 and 30 are moved between upper return positions P6 and lower return positions P7 accompanying swinging in alternating of the wiper arms 24 and 26.

In the present exemplary embodiment, when the output shaft 32 is forward and reverse rotated with a third swing range $\theta 3$, the wiper blades 28 and 30 move between the lower return positions P7 and stopping positions P8 accompanying swinging in alternating of the wiper arms 24 and 26.

Moreover, in the present exemplary embodiment, when the output shaft 32 is forward-reverse rotated with a fourth swing range θ4, the wiper blades 28 and 30 move between the upper return positions P6 and the stopping positions P8 accompanying the swinging in alternating of the wiper arms 24 and 26.

In FIG. 4, the lower return position P7 of the present exemplary embodiment corresponds to the first stopping position P3 of the first exemplary embodiment.

In FIG. 4, the upper return position P6 of the present exemplary embodiment corresponds to the lower turn position P2 referred to the above, however it is possible to position the upper return position P6 at a different position to the lower turn position P2 by adjusting the third swing range θ3 and the fourth swing range θ4 that are forward and reverse rotation ranges of the output shaft 32. Moreover, it is also possible to provide the upper return position P6 and the lower return position P7 between the upper turn position P1 and the lower turn position P2 by changing the forward and reverse rotation range of the output shaft 32.

In the present exemplary embodiment, the control unit 220 stores history of control of the wiper motor 18 in a memory, and the wiper blades 28 and 30 are swung to and stopped at the stopping position P8 when swinging in alternating of the wiper blades 28 and 30 between the upper turn position P1 and the lower turn position P2 is ended (finished).

In the present exemplary embodiment, referring is made to the history stored in the memory when the ignition switch 48 has been switched ON or OFF. The wiper blades 28 and 30 are stopped at the stopping positions P8 after being swung to the upper return positions P6 provided above the stopping positions P8 in a case in which the wiper blades 28 and 30 were stopped at the stopping positions P8 after being swung to the lower return positions P7 by control at the last time (the previous time) when the ignition switch 48 was switched ON or OFF. On the other hand, the wiper blades 28 and 30 are stopped at the stopping positions P8 after being swung to the lower return positions P7 in a case in which the wiper blades 28 and 30 were stopped the stopping positions P8 after being swung to the upper return positions P6 by control at the last time when the ignition switch 48 was switched ON or OFF.

Figure 5:
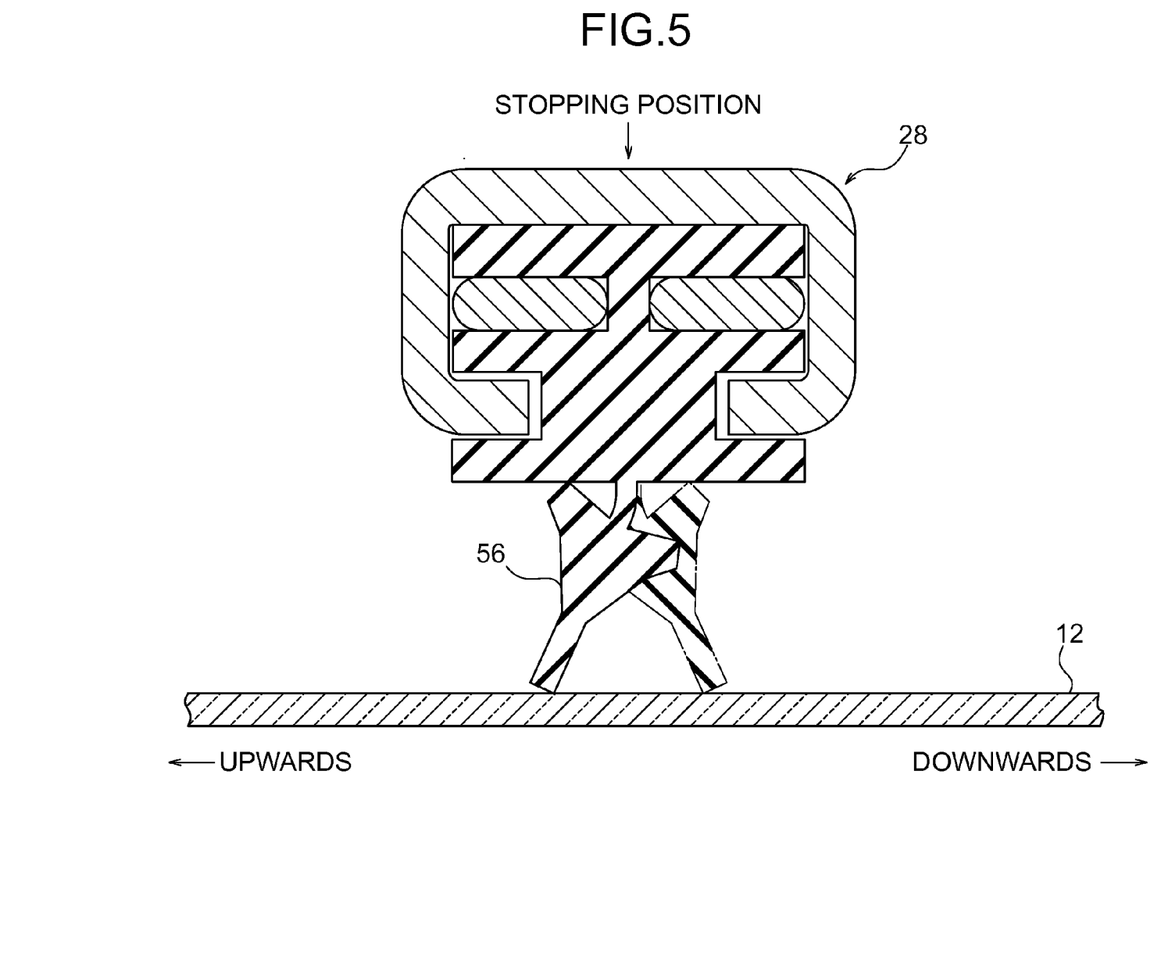
FIG. 5 is a cross-section, including a front glass, of a wiper blade of a wiper device according to the second exemplary embodiment of the present invention in a stopping position.

Consequently, as illustrated in FIG. 5, a cross-section of the wiper blade 28, including the front glass 12, at the stopping position of the wiper device 100 according to the present exemplary embodiment, in the present exemplary embodiment, the wiper blade 28 is always stopped at the stopping position P8, and the angle of the lip portion 56 with respect to the front glass 12 can be changed by, each time the ignition switch is operated, moving the wiper blade 28 from the stopping position P8, then returning at the upper return position P6 or returning at the lower return position P7, and then going back and stopping the wiper blade 28 at the stopping position P8.

In the present exemplary embodiment, the separation between the lower return position P7 and the upper return position P6 can be changed by adjusting the third swing range θ3 and/or the fourth swing range θ4 that are the forward and reverse rotation ranges of the output shaft 32. This separation needs to be a distance sufficient to obtain a change in the angle (tilt direction) of the lip portion 56, which is the portion of each of the wiper blades 28 and 30 that wipes the front glass 12, with respect to the front glass 12 (in the exemplary embodiments, for example, the tilt towards the front glass 12 upper side is changed to the tilt towards the front glass 12 lower side).

This distance is affected by differences in the flexibility of the lip portions 56 of the wiper blades 28 and 30, the structure of portions of the wiper device, the curvature of the front surface of the front glass 12 and/or surface treatment of the front glass 12. It is accordingly possible to determine this distance statistically by performing testing.

Figure 6:
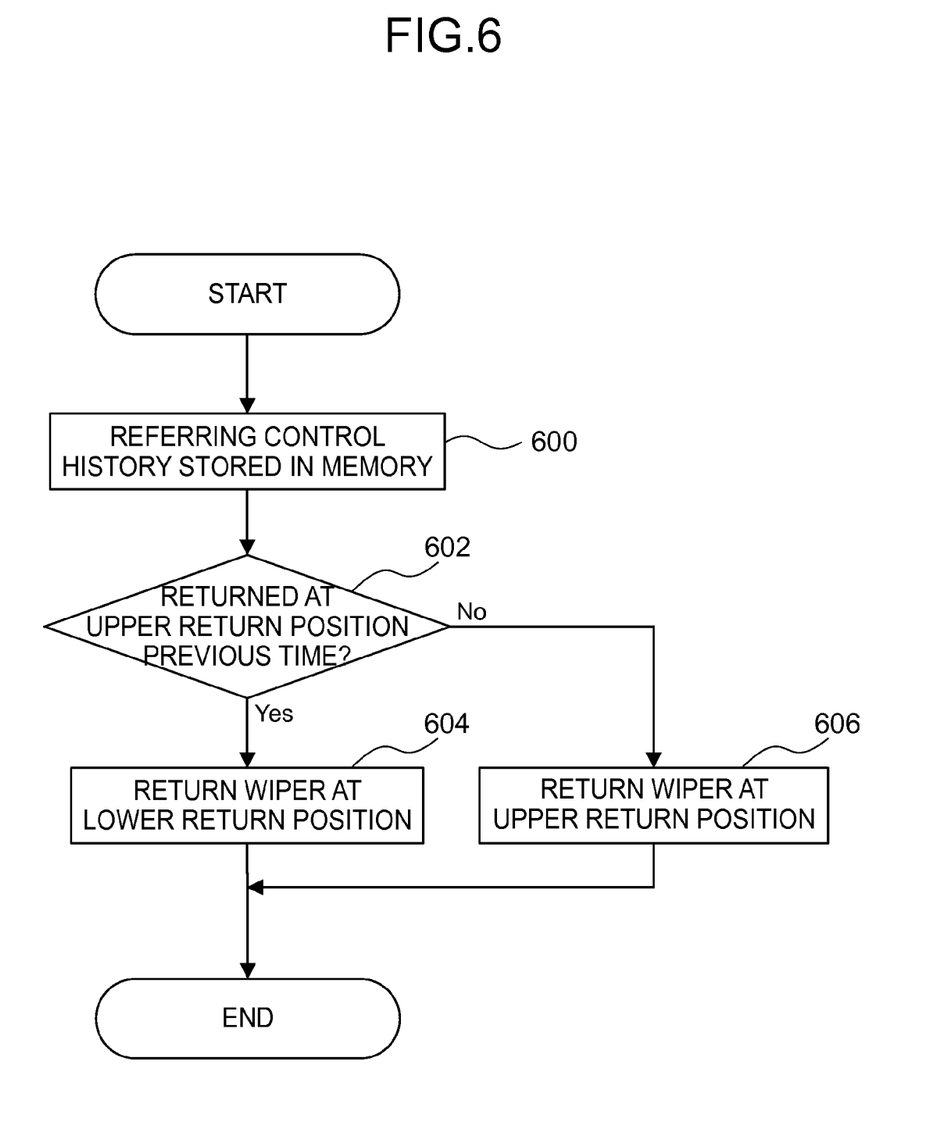
FIG. 6 is a flow chart illustrating control of a wiper device according to the second exemplary embodiment of the present invention.

Explanation follows regarding control of the wiper device 100 according to the present exemplary embodiment. FIG. 6 is a flow chart illustrating control of the wiper device 100 according to the present exemplary embodiment.

When the ignition switch 48 is operated, referring is made, at step 600, to the history of the record of control of the stopping positions of the wiper blades 28 and 30 when the ignition switch 48 is operated, which history is stored in the memory.

At step 602, in the referred history, determination is made as to whether or not the wiper blades 28 and 30 were controlled so as to be returned at the upper return position P6, namely, whether or not the wiper blades 28 and 30 were controlled so as to be swung from the stopping positions P8 to the upper return positions P6, thereafter to be stopped at the stopping positions P8, at the last time (the previous time) when the ignition switch 48 was switched ON or OFF.

When determined at step 602 that, the last time the ignition switch 48 was switched ON or OFF, the wiper blades 28 and 30 were controlled so as to be stopped at the stopping positions P8 after swinging from the stopping positions P8 to the upper return positions P6, then at step 604, the wiper blades 28 and 30 are stopped at the stopping positions P8 after swinging the wiper blades 28 and 30 from the stopping positions P8 to the lower return positions P7, and processing is ended.

When determined at step 602 that, the last time the ignition switch 48 was switched ON or OFF, control was not performed to stop the wiper blades 28 and 30 at the stopping positions P8 after swinging the wiper blades 28 and 30 from the stopping positions P8 to the upper return positions P6, namely when determined that, the last time the ignition switch 48 was switched ON or OFF, control was performed to stop the wiper blades 28 and 30 at the stopping positions P8 after swinging the wiper blades 28 and 30 from the stopping positions P8 to the lower return positions P7, then at step 606, the wiper blades 28 and 30 are stopped at the stopping positions P8 after swinging the wiper blades 28 and 30 from the stopping positions P8 to the upper return positions P6, and processing is ended.

Note that configuration may be made such that determination is made at step 602 as to whether or not, the last time the ignition switch 48 was switched ON or OFF, control was performed to stop the wiper blades 28 and 30 at the stopping positions P8 after swinging from the stopping positions P8 to the lower return positions P7.

As explained above, according to the wiper device 100 of the present exemplary embodiment, plastic deformation of the rubber of the wiper blades 28 and 30 can be suppressed, since each time the ignition switch has been switched ON or OFF, the wiper blades 28 and 30 are stopped at the original stopping position after being moved with the specific range. Moreover, in contrast to the first exemplary embodiment, the wiper blades 28 and 30 in the stop state can also always be disposed in a constant (same) position.

Moreover, in the present invention, it is not affected by the weather, irrespective of wiper blade operation such as during wet weather, since swinging of the wiper blades is based on switching the ignition switch ON or OFF.

What is claimed is:

1. A wiper device comprising:
a wiper blade that wipes a front glass of a vehicle, via a wiper arm which is supported so as to be capable of swinging with respect to the vehicle, by swinging of the wiper arm;
a wiper motor that includes an output shaft connected to the wiper arm through a link so as to be capable of transmitting rotation force to the wiper arm, and that rotates the output shaft to swing the wiper blade in alternating, the wiper motor rotating forward and reverse the output shaft to swing the wiper blade between an upper turn position and a lower turn position; and
a control unit that, in a case in which an ignition switch of the vehicle is switched ON or OFF, controls the wiper motor such that the stopped wiper blade which is stopped in a specific range which is set in the vicinity of the lower turn position is swung within the specific range from a position where the stopped wiper blade is located at a time when the ignition switch is switched ON or OFF, and thereafter the wiper blade swinging within the specific range is stopped in the specific range,
wherein an upper end and a lower end of the specific range in a swinging direction of the wiper blade are set at positions which are in the vicinity of the lower turn position,
wherein the upper end and the lower end of the specific range are set at the positions which are nearer to the lower turn position than the upper turn position in the swinging direction of the wiper blade.

2. The wiper device of claim 1, wherein:
in a case of stopping the swinging of the wiper blade between the upper turn position and the lower turn position, the wiper motor swings the wiper blade either to a first stopping position or a second stopping position provided above the first stopping position and stops the wiper blade; and
in the case in which the ignition switch is switched ON or OFF, the control unit controls the wiper motor such that
the wiper blade is swung and stopped at the second stopping position in a case in which the wiper blade is stopped at the first stopping position at the time when the ignition switch is switched ON or OFF, and
the wiper blade is swung and stopped at the first stopping position in a case in which the wiper blade is stopped at the second stopping position at the time when the ignition switch is switched ON or OFF.

3. The wiper device of claim 2, wherein:
the control unit includes a storage section that stores a history of control performed with respect to the wiper motor; and
in the case in which the ignition switch is switched ON or OFF, the control unit controls the wiper motor such that the history stored in the storage section is read,
the wiper blade is swung and stopped at the second stopping position in a case in which the wiper blade was stopped at the first stopping position by control performed at the previous time when the ignition switch was switched ON or OFF, and
the wiper blade is swung and stopped at the first stopping position in a case in which the wiper blade was stopped at the second stopping position by control performed at the previous time when the ignition switch was switched ON or OFF.

4. The wiper device of claim 2, further comprising a detection unit that detects, in the case in which the ignition switch is switched ON or OFF, the position where the stopped wiper blade is located at the time when the ignition switch is switched ON or OFF, wherein,
in the case in which the ignition switch is switched ON or OFF, the control unit controls the wiper motor such that
the wiper blade is swung and stopped at the second stopping position in a case in which the position of the wiper blade detected by the detection unit is the first stopping position, and
the wiper blade is swung and stopped at the first stopping position in a case in which the position of the wiper blade detected by the detection unit is the second stopping position.

5. The wiper device of claim 1, wherein:
in a case of stopping the swinging of the wiper blade between the upper turn position and the lower turn position, the wiper motor swings the wiper blade to a stopping position and stops the wiper blade;
the control unit includes a storage section that stores a history of control performed with respect to the wiper motor; and
in the case in which the ignition switch is switched ON or OFF, the control unit controls the wiper motor such that the history stored in the storage section is read,
the wiper blade is swung to an upper return position provided above the stopping position and thereafter is stopped at the stopping position in a case in which the wiper blade was swung to a lower return position provided below the stopping position and thereafter was stopped at the stopping position by control performed at the previous time when the ignition switch was switched ON or OFF, and
the wiper blade is swung to the lower return position and thereafter is stopped at the stopping position in a case in which the wiper blade was swung to the upper return position and thereafter was stopped at the stopping position by control performed at the previous time when the ignition switch was switched ON or OFF.

6. The wiper device of claim 5, wherein:
a separation between the stopping position and the upper return position and a separation between the stopping position and the lower return position are a distance such that an angle of a portion of the wiper blade, that wipes the front glass, with respect to the front glass can be changed by the wiper blade being moved by the amount of the separation.

7. The wiper device of claim 1, wherein the control unit controls the wiper motor such that the wiper blade is stopped in a state in which a tilt direction of a portion of the wiper blade, that wipes the front glass, with respect to the front glass is changed to a different direction with respect to a tilt direction of the portion of the wiper blade at the time when the ignition switch is switched ON or OFF.

8. A wiper device comprising:
a wiper blade that wipes a front glass of a vehicle, via a wiper arm which is supported so as to be capable of swinging with respect to the vehicle, by swinging of the wiper arm;
a wiper motor that includes an output shaft connected to the wiper arm through a link so as to be capable of transmitting rotation force to the wiper arm, and that rotates the output shaft to swing the wiper blade in alternating; and
a control unit that, in a case in which an ignition switch of the vehicle is switched ON or OFF, controls the wiper motor such that the wiper blade is swung within a specific range from a position where the stopped wiper blade is located at a time when the ignition switch is switched ON or OFF, and the wiper blade is then stopped, wherein:

the wiper motor rotates forward and reverse the output shaft to swing the wiper blade between an upper turn position and a lower turn position, and in a case of stopping the swinging of the wiper blade between the upper turn position and the lower turn position, the wiper motor swings the wiper blade either to a first stopping position or a second stopping position provided above the first stopping position and stops the wiper blade; and in the case in which the ignition switch is switched ON or OFF, the control unit controls the wiper motor such that the wiper blade is swung and stopped at the second stopping position in a case in which the wiper blade is stopped at the first stopping position at the time when the ignition switch is switched ON or OFF, and the wiper blade is swung and stopped at the first stopping position in a case in which the wiper blade is stopped at the second stopping position at the time when the ignition switch is switched ON or OFF.

\* \* \* \* \*